United States Patent
Mast et al.

(10) Patent No.: US 11,011,821 B2
(45) Date of Patent: May 18, 2021

(54) DEPLOYABLE CONICAL SPACE ANTENNA AND ASSOCIATED METHODS

(71) Applicant: EAGLE TECHNOLOGY, LLC, Melbourne, FL (US)

(72) Inventors: Alan W. Mast, Melbourne Beach, FL (US); Gregory M. Jandzio, Melbourne, FL (US); Charles F. Dull, Palm Bay, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 47 days.

(21) Appl. No.: 16/507,184

(22) Filed: Jul. 10, 2019

(65) Prior Publication Data

US 2021/0013581 A1 Jan. 14, 2021

(51) Int. Cl.
| | |
|---|---|
| *H01Q 1/08* | (2006.01) |
| *H01Q 1/38* | (2006.01) |
| *H01Q 1/48* | (2006.01) |
| *H04B 1/40* | (2015.01) |
| *H01Q 11/10* | (2006.01) |
| *H01Q 19/28* | (2006.01) |

(52) U.S. Cl.
CPC ............. *H01Q 1/085* (2013.01); *H01Q 1/081* (2013.01); *H01Q 1/38* (2013.01); *H01Q 1/48* (2013.01); *H04B 1/40* (2013.01)

(58) Field of Classification Search
CPC .......... H01Q 1/085; H01Q 1/081; H01Q 1/38; H01Q 1/48; H01Q 11/10; H01Q 19/28; H01Q 1/427; H01Q 1/288; H01Q 1/082; H01Q 1/1292; H01Q 1/28; H01Q 5/55; H01Q 13/02; H01Q 13/00
See application file for complete search history.

(56) References Cited

U.S. PATENT DOCUMENTS

| | | | |
|---|---|---|---|
| 3,715,759 | A | 2/1973 | Esposito et al. |
| 4,899,167 | A | 2/1990 | Westphal |
| 5,017,925 | A | 5/1991 | Bertiger et al. |
| H1460 | H | 7/1995 | Davis |
| 9,024,831 | B2 | 5/2015 | Wang |
| 2004/0070549 | A1 | 4/2004 | Thornburgh |
| 2016/0258595 | A1 | 9/2016 | Mossdorf |

(Continued)

FOREIGN PATENT DOCUMENTS

WO 2014064646 5/2014

OTHER PUBLICATIONS

Constantine et al., "UHF Deployable Antenna Structures for CubeSats," 2014 US Nat'l Committee of URSI Nat'l Radio Sci Meeting (USNC-URSI NRSM), IEEE Oct. 2018, pp. 1-2.

(Continued)

*Primary Examiner* — Wei (Victor) Y Chan
(74) *Attorney, Agent, or Firm* — Allen, Dyer, Doppelt + Gilchrist, P.A.

(57) ABSTRACT

An outer space deployable antenna may include a ground plane and a flexible antenna coupled to the ground plane and moveable between a flat stored configuration and a conical deployed configuration. The flexible antenna may include a dielectric layer and a plurality of antenna arms. The flexible antenna may have a circular shape with a circular sector notch in the flat stored configuration that closes in the conical deployed configuration.

26 Claims, 4 Drawing Sheets

(56) References Cited

U.S. PATENT DOCUMENTS

2018/0159240 A1* 6/2018 Henry .................. H01Q 3/245

OTHER PUBLICATIONS

Olson et al., "Structural Architectures for a Deployable Wideband UHF Antenna," 2012 53rd AIAA/ASME/ASCE/AHS/ASC, Ameri Inst. of Aeronautics & Astronautics, Jun. 2012, pp. 1-10.

Constantine et al., "UHF Deployable Helical Antennas for CubeSats," IEEE Transactions on Antennas and Propagation, vol. 64, Issue: 9, Sep. 2016, pp. 3752-3759.

Yao et al., "Morphing Origami Conical Spiral Antenna Based on the Nojima Wrap," IEEE Transactions on Antennas and Propagation, vol. 65, Issue: 5, May 2017, pp. 2222-2232.

"Nuclear Blast Detection Antennas Delivered," 2006 Space and Astronomy News, retrieved from http://www.spacearchive.info/news-2006-archive.htm, Nov. 2006, pp. 1.

* cited by examiner

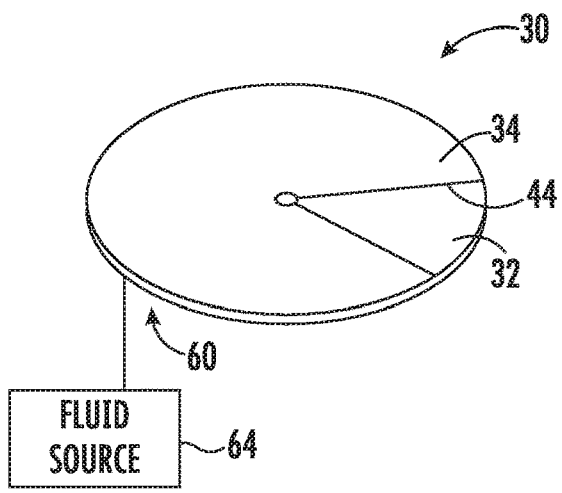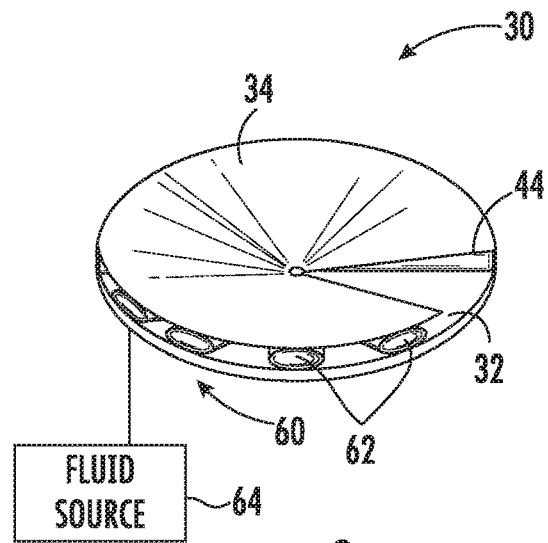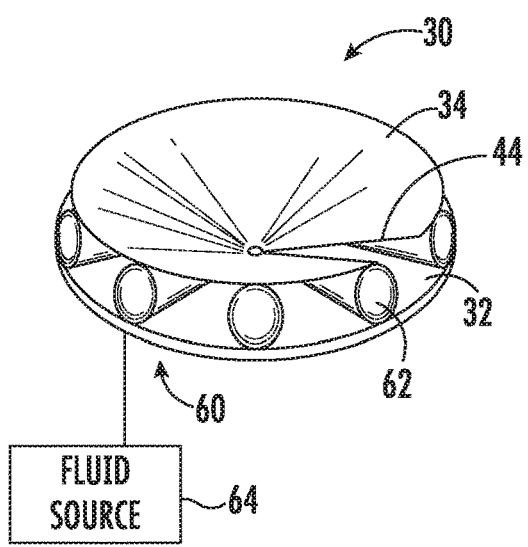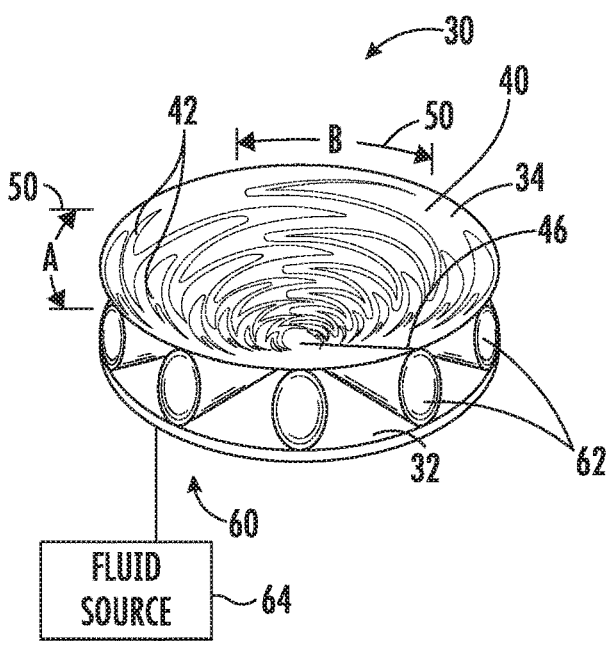

US 11,011,821 B2

DEPLOYABLE CONICAL SPACE ANTENNA AND ASSOCIATED METHODS

FIELD OF THE INVENTION

The present invention relates to the field of antennas, and more particularly, to outer space deployable antennas and related methods.

BACKGROUND OF THE INVENTION

Small satellites have limited space to store electronics and an antenna, which becomes technically challenging when the electronics and antenna are designed to operate at the lower L-band and S-band frequencies. Antennas operating at those frequencies usually are designed as high performance, wideband antennas, but take up relatively large volume. Even antennas designed to operate at the higher frequencies up to and above 20 GHz have size constraints that make them difficult to implement into small satellites, even though antennas at those upper frequencies are usually reduced in size. This problem becomes challenging when small satellites are built as CubeSat platforms, which are miniaturized satellites made up of multiple block units known as CubeSats, each block unit being about 4 by 4 by 4 inches. CubeSats are advantageous for smaller satellites because they are designed to use commercial off-the-shelf (COTS) components for their major circuits, and can be easily implemented for custom satellite operations. There is also a need for compact stowage at the satellite during launch so that the satellite fits within launch vehicle payload fairings.

In most practical small satellite applications, a number of CubeSat units are combined together to form a CubeSat platform as a small satellite that is typically intended for Low Earth Orbit (LEO) and perform scientific research and explore new space technologies. CubeSats are advantageous because their use as block units to build small satellites shortens the satellite development cycle, permits greater diversity in satellite design since each small satellite can be designed for a specific function, and reduces the overall cost of satellite deployment. CubeSats and even larger classes of small satellites often are suitable for launch with multiple small satellites per payload, thus using the excess capacity of larger launch vehicles and reducing the risk to the rest of the launch vehicle and other payloads.

Typical CubeSat satellite platforms are formed from multiple, individual CubeSat block units combined together and include a 6U design of about 4×8×12 inches or a 12U design of about 8×8×12 inches. Additionally, the small satellite class also envelopes larger form factors, such as EELV Secondary Payload Adapter (ESPA) each forming a satellite in the 100 to about 300 kg class. Small satellites can be propelled by cold gas, chemical promotion, electric propulsion, or solar sails. Most CubeSats and similar small satellites have internal batteries for power, which preferably include solar cells.

Many Low Earth Orbit (LEO) small satellites require an antenna for communicating in the L-band and S-band, and also X-band and Ka-band can be used for higher data rate communications. These higher frequency bands allow the use of smaller antennas due to the higher frequencies, but the constraints of small satellites, such as CubeSats, still make it difficult to implement workable antennas, even at the higher frequencies. These small satellites have limited volume and designing an antenna that can fit within the allocated volume is not always possible, therefore requiring compact storage and deployment once orbit is reached.

For example, horn antennas are often used on larger satellites, but take up a relatively large volume, especially at the lower L-band and S-band frequencies, and are challenging to fit onto smaller satellites. Wideband antennas and communication modems offer valuable potential to communicate with various ground stations or even perhaps other satellites directly. A log periodic parasitic monopole antenna (LPPMA) operates as a high performance antenna and may be used in demanding satellite communication applications since it has wideband performance, multi-polarization, and excellent directivity.

A technical drawback of this antenna, however, is still its large volume, making it difficult to implement in small satellites. For example, a log periodic parasitic monopole antenna may have a wide 10:1 bandwidth and operate up to 20 GHz and provide six arms for multi-polarization in both transmit and receive applications, making that antenna advantageous, but difficult to implement in CubeSat and similar small satellite applications. Those positive operating benefits also exist with a multi-arm sinuous antenna, but that antenna is also difficult to implement with small satellites since the multi-arm sinuous antenna uses a relatively large volume compared to the size of the satellite. As a result, deployment of most antennas, including a multi-arm sinuous antenna, is difficult on small satellites, especially those manufactured as CubeSats.

SUMMARY OF THE INVENTION

In general, an outer space deployable antenna may include a ground plane and a flexible antenna coupled to the ground plane and moveable between a flat stored configuration and a conical deployed configuration. The flexible antenna may comprise a dielectric layer and a plurality of antenna arms carried thereby. The flexible antenna may have a circular shape with a circular sector notch in the flat stored configuration that closes in the conical deployed configuration.

The plurality of antenna arms may comprise a plurality of sinuous antenna arms. The plurality of sinuous arms may each be contained within a respective circular sector of the flexible antenna. The circular sector notch in the flexible antenna may close to a seam line in the conical deployed configuration.

In some embodiments, the flexible antenna may have a center location coupled to the ground plane. The ground plane may comprise a rigid circular conductor. An actuator may be coupled between the ground plane and the flexible antenna to move the flexible antenna from the flat stored configuration to the conical deployed position. The actuator may comprise an inflatable membrane or circumferential ring support. The ground plane may comprise a flexible ground plane.

In yet another embodiment, a satellite may include a satellite housing, a satellite transceiver carried by the satellite housing, and an outer space deployable antenna carried by the satellite housing and coupled to the satellite transceiver. The outer space deployable antenna may comprise a ground plane and a flexible antenna coupled to the ground plane and moveable between a flat stored configuration and a conical deployed configuration. The flexible antenna may comprise a dielectric layer and a plurality of antenna arms carried thereby. The flexible antenna may have a circular shape with a circular sector notch in the flat stored configuration that closes in the conical deployed configuration.

Another aspect is directed to a method for making an outer space deployable antenna. The method may include coupling a flexible antenna to a ground plane and moveable between a flat stored configuration and a conical deployed configuration. The flexible antenna may comprise a dielectric layer and a plurality of antenna arms carried thereby. The flexible antenna may have a circular shape with a circular sector notch in the flat stored configuration that closes in the conical deployed configuration.

BRIEF DESCRIPTION OF THE DRAWINGS

Other objects, features and advantages of the present invention will become apparent from the detailed description of the invention which follows, when considered in light of the accompanying drawings in which:

FIG. 2 is a perspective view of the antenna of FIG. 1 in its flat stored configuration.

FIG. 3 is a perspective view of the antenna of FIG. 2 in a partially deployed configuration.

FIG. 4 is a perspective view of the antenna of FIG. 3 as it is deployed more and showing how the circular sector notch begins to close.

FIG. 5 is a perspective view of the antenna of FIG. 4 in its conical deployed configuration showing the closed circular sector notch.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
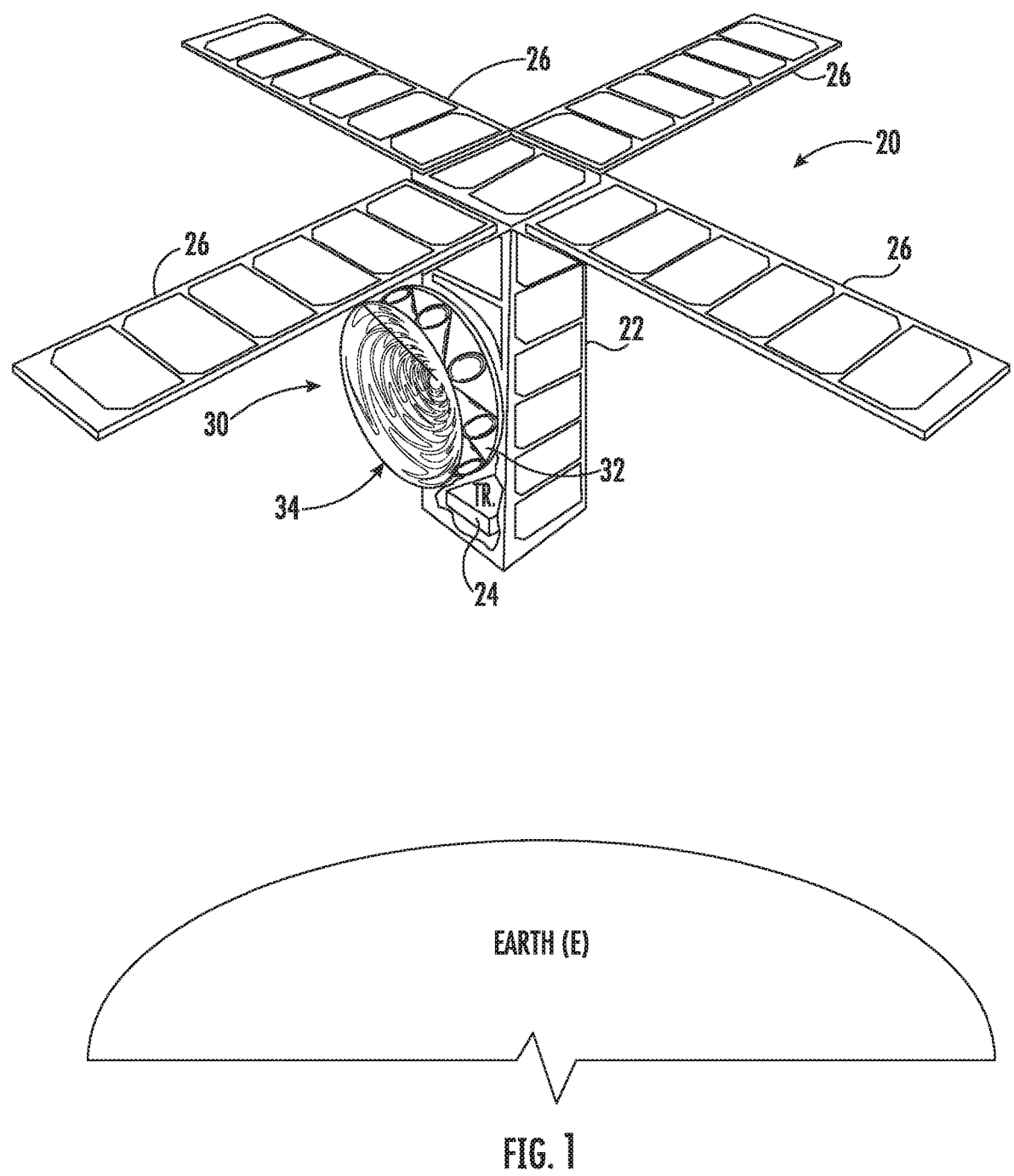
FIG. 1 is a perspective view of a satellite carrying the outer space deployable antenna in its conical deployed configuration.

Referring initially to FIG. 1, a satellite is illustrated generally at 20 and shown orbiting Earth (E) in a Low Earth Orbit (LEO) as typical for small satellites, although any orbit altitude may be established depending on satellite functions. The satellite 20 includes a satellite housing 22 shown partially cut away and a satellite transceiver 24 carried by the satellite housing 22 and solar panels 26. The satellite 20 is a small form factor satellite, such as formed by one or more CubeSats. The satellite transceiver 24 and any associated electronic components and circuits may be formed from Conventional Off-The-Shelf (OTS) components as is typical for those smaller satellites formed from CubeSats.

An outer space deployable antenna is indicated generally at 30 and carried by the satellite housing 22 and coupled to the satellite transceiver 24. Basic components of the outer space deployable antenna 30 include a ground plane 32 and a flexible antenna 34 coupled to the ground plane and shown in its conical deployed configuration after it has been deployed once the satellite reached the desired orbit. The flexible antenna 34 is deployed from its flat stored configuration as shown in FIG. 2.

The flexible antenna 34 includes a dielectric layer 40 and a plurality of antenna arms 42 carried thereby (FIG. 5). The antenna arms 42 could be formed by etching copper traces from a metal layer deposited on the dielectric layer 40. In its flat stored configuration shown in FIG. 2, the flexible antenna 34 has a circular shape and a circular sector notch 44, which closes to a seam line 46 when the flexible antenna 34 is deployed in the conical deployed configuration as shown in FIG. 5. The ground plane 32 in an example is formed as a rigid circular conductor having a diameter about the same as the diameter of the flexible antenna 34 when in the flat stored configuration. Different materials can be used to form the ground plane 32, such as, for example, a copper membrane exhibiting rigidity. In another example, the ground plane could be formed by a thin copper foil if it is backed by a material having rigidity and secured on the side of the satellite 20 to give support. The thickness of the ground plane 32 can vary, depending on its construction from as low as a few mil thick to substantially thicker dimensions of 10 to 20 mil or above.

The sinuous antenna arms 42 could have some overlap with each as shown in FIG. 5, where each sinuous antenna arm is bounded by a specific circular section 50, where a first sector 50 is labeled by the arc "A" and a second sector is labeled by the arc "B" and showing some overlap between the two arcs.

Figure 6:
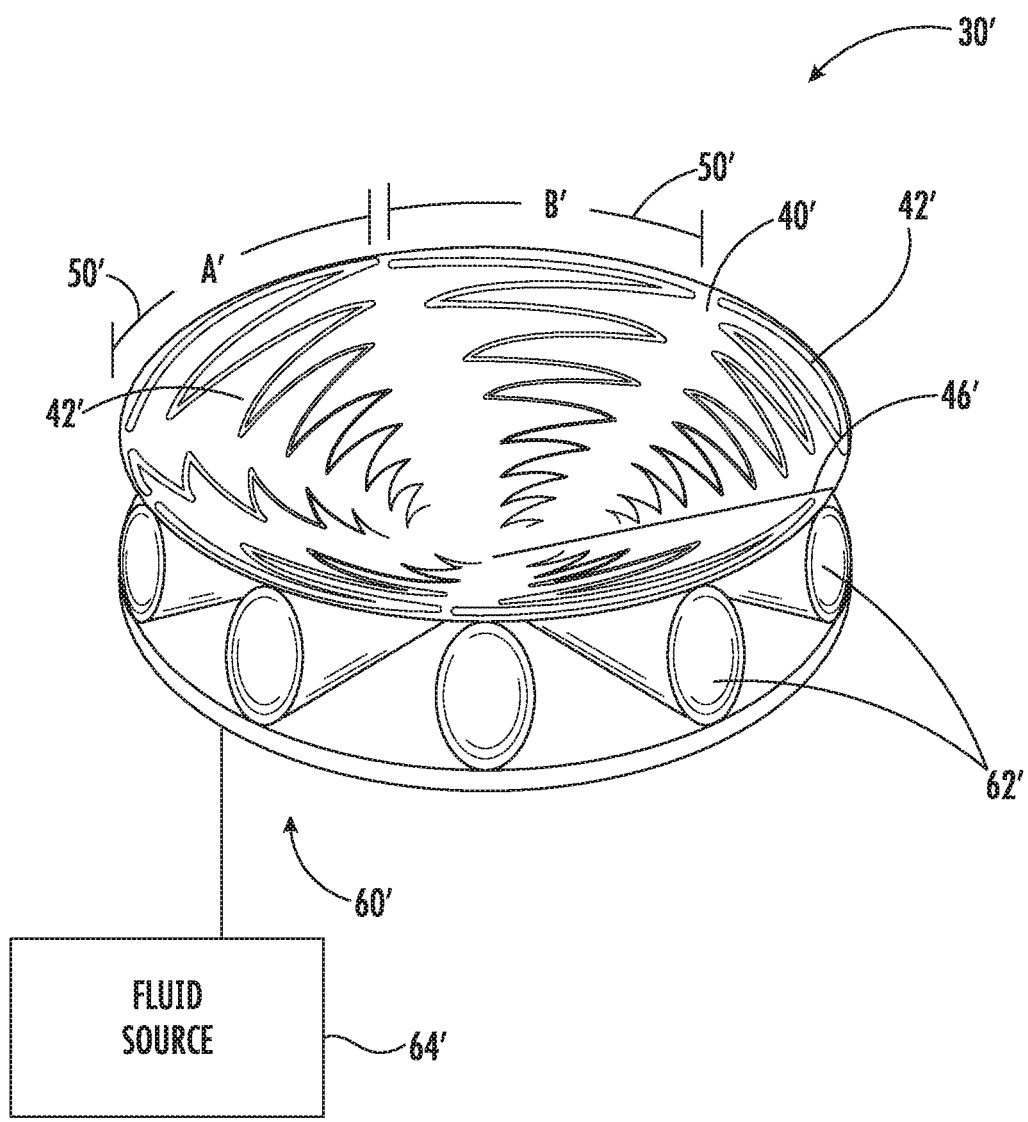
FIG. 6 is a perspective view of another embodiment of the antenna similar to that of FIG. 5 showing a different configuration of the sinuous antenna arms.

In a second embodiment of FIG. 6, it is possible that each sinuous antenna arm 42' is contained within a separate non-overlapping sector 50' where each sector is distinct. In that illustrated embodiment, prime notation is used to distinguish from the embodiment of FIGS. 1-5. Thus, each sinuous antenna arm 42' in that embodiment of FIG. 6 is spaced from each adjacent antenna arm with no overlap between the various curves forming the antenna arms.

As to both embodiments, i.e., that of FIGS. 1-5 and that of FIG. 6, the specific shape of the antenna arms 42, 42' for both embodiments will depend on the end-use applications for the antenna 30, 30'. As noted before, the ground plane 32, 32' is formed as a rigid circular conductor and the flexible antenna 34, 34' has a central location coupled to the ground plane, shown by its center point as illustrated best in FIGS. 5 and 6. In an example for both embodiments, the flexible antenna 34, 34' could be formed from a Mylar material, which may include a half a mil of copper that is etched to form traces or other components for the antenna arms 42, 42'.

Referring now again to FIGS. 1-5, the description proceeds with the understanding that the embodiment of the antenna 30' shown in FIG. 6 may have similar components and function. The ground plane 32 should provide some stability and be rigid, while the flexible antenna 34 may be formed from a flexible thin material, such as Mylar or other polymer material, and could range from a 1 or 2 mil thickness to substantially greater thickness. Other thin film laminate material could be used. Mylar has been found advantageous as a metallized BoPET (Biaxially-Oriented Polyethylene Terephthalate) since it has good tensile strength, chemical and dimensional stability, good barrier resistance and insulator properties, and excellent reflectivity.

No matter what materials are used, the flexible antenna 34 must be moved or "popped up" from its flat stored configuration into its conical deployed configuration, where the circular sector notch 44 shown in the flat stored configuration (FIG. 2) closes to a seam line 46 in the conical deployed configuration (FIG. 5). In an example, a strong backing material can be applied between the flexible antenna 34 and ground plane 32 to help maintain the flexible antenna in its conical deployed configuration. For this reason, an actuator indicated generally at 60 deploys or "pops up," i.e., moves upward the flexible antenna 34 into its conical deployed configuration. The actuator 60 may also maintain its specific conical shape or configuration of the flexible antenna 34 and ensure proper operation of the antenna 30 having the sinuous antenna arms 42 relative to the ground plane 32. As noted before, the flexible antenna 34 may be formed from a material that is a few mils thick and include a metallized layer of about half a mil to a mil thickness from which the antenna arms are formed, but that small thickness uses the actuator 60 that is operationally efficient to "pop up" or move the flexible antenna 34 into its conical deployed configuration and maintain the desired conical shape.

In one embodiment, the actuator 60 is coupled between the ground plane 32 and the flexible antenna 34 to move the flexible antenna from the flat stored configuration and the conical deployed position. In an example, the actuator 60 may be formed as an inflatable balloon or similar inflatable membrane 62 such as illustrated in FIGS. 3-5, which can be sectorized and extends between the ground plane 32 and flexible antenna 34. The balloon 62 is inflated in this example via the actuator 60 that may include a fluid source 64 that injects fluid such as air or other fluid into the balloon 62 and moves the flexible antenna 34 upward, e.g., "pops up," the flexible antenna 34 as the balloon or similar membrane inflates, which then closes the circular sector notch 44 in the flexible antenna to a seam line 46 in the conical deployed configuration. The inflatable balloon 62 could be a number of separate but interconnected inflatable balloons as illustrated, with an edge of one balloon positioned at one side of the circular sector notch 44, and an edge of another balloon positioned at the other edge of the circular sector notch 44, allowing the circular sector notch 44 to close into a seam line 46 as the balloons are inflated. The fluid source 64 could have one fluid line or several to respective balloons 62.

It is also possible to use a foam material alone or in conjunction with the inflatable balloon 62, which may also help form a rigid backing to the flexible antenna 34. In combination with an inflatable balloon or similar membrane 62, the loss of any air or other inflatable medium will have little effect since the foam would maintain the flexible antenna 34 in its conical deployed configuration. The foam could be activated to expand by injection of a chemical into another material to form the foam. In cold outer space applications, however, forming foam may not be as efficient as inflating balloons 62 under the flexible antenna 34. In one example, the foam material could include a cold hibernated elastic memory (CHEM).

The actuator 60 could also be formed from a metal ring or circumferential ring support that surrounds the periphery of the flexible antenna 34 in its flat stored configuration. The circumferential ring support may contract into itself, thereby reducing circumference and causing deployment forces in the antenna material. The metal ring may be split with one end of the split in the ring moveable into the other end of the split ring, such that when the ring is lifted vertically, the split end received in the other split end moves further and the diameter of the split ring decreases, thus ultimately closing the circular sector notch 44 as the ring is raised to its maximum height when the flexible antenna 34 is deployed. The split ring may be a spring form that is biased to reduce in diameter, but is constrained during launch precluding this motion. Actuation or release of the fixed spring results in the reduction in diameter, effectively driving the antenna surface into a conical shape. In an example, one end of the split ring could be attached to one edge of the circular sector notch 44, and the other end attached to the other edge of the circular sector notch 44, so that when the ring is raised and its diameter decreased, the circular sector notch closes to the seam line 46 and the flexible antenna 34 forms its conical configuration. This system of the split ring could be spring-loaded to deploy the flexible antenna 34 upward, for example, springs engaging the peripheral metal ring, driving it to decrease in diameter with the resulting motion moving the flexible antenna to deploy upward.

An advantage of the antenna 30 is the larger deployed volume of the flexible antenna 34 orthogonal to the ground plane 32, which provides a wider bandwidth because of the larger ground plane spacing with the flexible antenna. It is possible to stow the planar configured flexible antenna 34 and ground plane 32 on the side of a satellite 20, potentially under the solar panels 26 that enable spring deployment or other deployment when the solar panels expand outward from the satellite.

A different number of sinuous antenna arms 42 may be formed on the dielectric layer 40. In one example, six sinuous antenna arms 42 may be formed to provide greater wideband performance. It is possible to use the antenna 30 as a feed with an offset perimeter truss antenna in a wide range of commercial and satellite applications, from 0.1 to 10 GHz. It is possible to use a pop down three-dimensional conical ground plane with a planar element. Other techniques may be used such as a three-dimensional conical flexible antenna 34 that extends upward and a conical ground plane 32 that extends downward. In an example, the ground plane could be a flexible, deployable ground plane that deploys to a conical shape and the antenna surface remains flat with the metallized sinuous arms. The flexible, deployable ground plane could be formed from mesh or printed metallized substrate with the notch.

Figure 7:
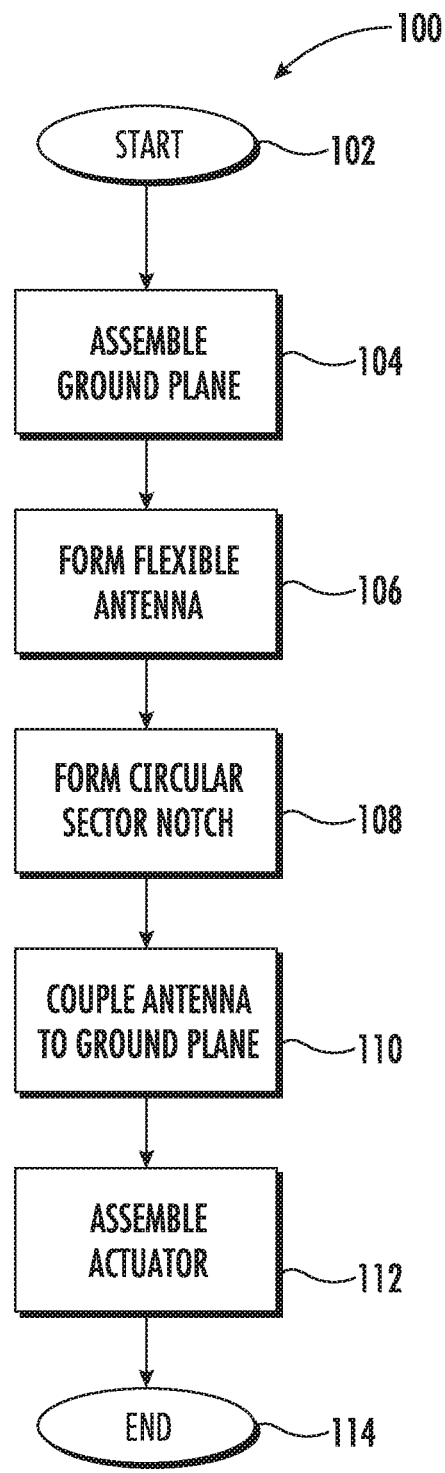
FIG. 7 is a high-level flowchart of a method for making the antenna.

Different manufacturing techniques may be used and in an example is shown in the high-level flowchart of FIG. 7. A method for making the outer space deployable antenna 30 is illustrated generally at 100. The process starts (Block 102) and a ground plane 32 is provided or assembled (Block 104). A flexible antenna 34 is formed having the dielectric layer 40 and plurality of antenna arms 42 (Block 106). The circular sector notch 44 is formed such as by cutting the notch (Block 108) and the flexible antenna 34 is coupled to the ground plane 32 (Block 110). The actuator 60 is assembled between the ground plane 32 and flexible antenna 34 (Block 112) and the process ends (Block 114).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An outer space deployable antenna comprising:
a ground plane; and
a flexible antenna coupled to the ground plane and moveable between a flat stored configuration and a conical deployed configuration, the flexible antenna comprising a dielectric layer and a plurality of antenna arms carried thereby, the flexible antenna having a circular shape with a circular sector notch in the flat stored configuration that closes in the conical deployed configuration.

2. The outer space antenna of claim 1 wherein the plurality of antenna arms comprises a plurality of sinuous antenna arms.

3. The outer space antenna of claim 2 wherein the plurality of sinuous arms are each contained within a respective circular sector of the flexible antenna.

4. The outer space antenna of claim 1 wherein the circular sector notch in the flexible antenna closes to a seam line in the conical deployed configuration.

5. The outer space antenna of claim 1 wherein the flexible antenna has a center location coupled to the ground plane.

6. The outer space antenna of claim 1 wherein the ground plane comprises a rigid circular conductor.

7. The outer space antenna of claim 1 comprising an actuator coupled between the ground plane and the flexible antenna to move the flexible antenna from the flat stored configuration and the conical deployed position.

8. The outer space antenna of claim 7 wherein the actuator comprises an inflatable membrane.

9. The outer space antenna according to claim 1 wherein said ground plane comprises a flexible ground plane.

10. A satellite comprising:
a satellite housing;
a satellite transceiver carried by the satellite housing; and
an outer space deployable antenna carried by the satellite housing and coupled to the satellite transceiver, the outer space deployable antenna comprising
a ground plane, and
a flexible antenna coupled to the ground plane and moveable between a flat stored configuration and a conical deployed configuration, the flexible antenna comprising a dielectric layer and a plurality of antenna arms carried thereby, the flexible antenna having a circular shape with a circular sector notch in the flat stored configuration that closes in the conical deployed configuration.

11. The satellite of claim 10 wherein the plurality of antenna arms comprises a plurality of sinuous antenna arms.

12. The satellite of claim 11 wherein the plurality of sinuous arms are each contained within a respective circular sector of the flexible antenna.

13. The satellite of claim 10 wherein the circular sector notch in the flexible antenna closes to a seam line in the conical deployed configuration.

14. The satellite of claim 10 wherein the flexible antenna has a center location coupled to the ground plane.

15. The satellite of claim 10 wherein the ground plane comprises a rigid circular conductor.

16. The satellite of claim 10 comprising an actuator coupled between the ground plane and the flexible antenna to move the flexible antenna from the flat stored configuration and the conical deployed position.

17. The satellite of claim 16 wherein the actuator comprises an inflatable membrane.

18. The satellite of claim 10 wherein said ground plane comprises a flexible ground plane.

19. A method for making an outer space deployable antenna comprising:
coupling a flexible antenna to a ground plane and moveable between a flat stored configuration and a conical deployed configuration, the flexible antenna comprising a dielectric layer and a plurality of antenna arms carried thereby, the flexible antenna having a circular shape with a circular sector notch in the flat stored configuration that closes in the conical deployed configuration.

20. The method of claim 19 wherein the plurality of antenna arms comprises a plurality of sinuous antenna arms.

21. The method of claim 20 wherein the plurality of sinuous arms are each contained within a respective circular sector of the flexible antenna.

22. The method of claim 19 wherein the circular sector notch in the flexible antenna closes to a seam line in the conical deployed configuration.

23. The method of claim 19 wherein the flexible antenna has a center location coupled to the ground plane.

24. The method of claim 19 wherein the ground plane comprises a rigid circular conductor.

25. The method of claim 19 comprising an actuator coupled between the ground plane and the flexible antenna to move the flexible antenna from the flat stored configuration and the conical deployed position.

26. The method of claim 25 wherein the actuator comprises an inflatable membrane.

* * * * *